Dec. 9, 1924.

J. P. EASTMAN

HOSE COUPLING

Filed Dec. 21, 1920

1,518,778

Inventor:
Joseph P. Eastman
By Young and Young
Attorneys

Witness:
Robert E. Weber

Patented Dec. 9, 1924.

1,518,778

UNITED STATES PATENT OFFICE.

JOSEPH P. EASTMAN, OF MANITOWOC, WISCONSIN.

HOSE COUPLING.

Application filed December 21, 1920. Serial No. 432,220.

*To all whom it may concern:*

Be it known that JOSEPH P. EASTMAN, a citizen of the United States, and resident of Manitowoc, in the county of Manitowoc and State of Wisconsin, has invented certain new and useful Improvements in Hose Couplings, and I do hereby declare that the following is a full, clear, and exact description thereof.

My invention refers to new and useful improvements in means for connecting metallic couplings, unions and the like, to flexible and more particularly non-expansible tubing. In my former application, Serial No. 314,650, I have provided for obtaining a fluid-tight connection between couplings and expansible tubing, wherein an expander or sleeve is inserted into the end of the tubing for expanding the same within the coupling. However, in certain tubing where a hard central core of a non-expansible nature is used, it is impossible to employ an expander, and hence, great difficulty has been encountered in obtaining a tight and rigid connection between the tubing and coupling, whereby the coupling is prevented from stripping off.

It is therefore the principal object of the invention to provide an arrangement for connecting a coupling to tubing of this character in such a manner that the same cannot be withdrawn or stripped from the tubing.

With this general object in view, the invention resides in the novel features of construction and combination and arrangement of parts, which will be hereinafter more particularly described and claimed and shown in the accompanying drawings, in which:

While the drawings show the invention applied in a coupling, it is obvious that the essential features thereof may be used in connection with unions and the like and that various minor changes may be made in the form and proportion of the several parts, without departing from the principles of the invention.

Figure 1:
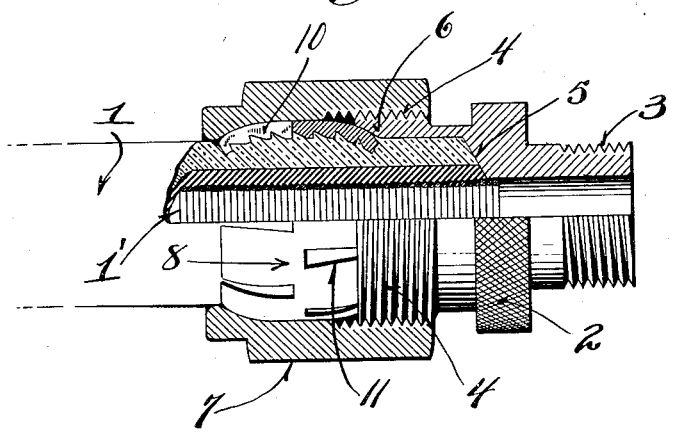
Figure 1 represents a part elevational and part sectional view of a tubing having a metallic coupling disposed thereon.
Figure 2:
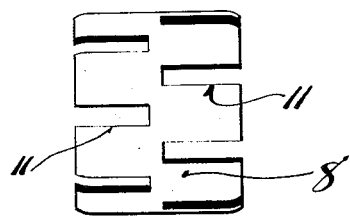
Figure 2 is an elevational view of the compressing band employed.

Referring more particularly to the drawings, the numeral 1 denotes arm end portion of a section of flexible tubing, having a central core of non-elastic material, which in the present instance is a metallic coil 1'. The flexible tubing may be multiple, as shown in Figure 1, if desired. Inserted over the end of the tubing is a coupling member 2, which includes an externally threaded nipple 3, having a bore substantially the diameter of the bore of the tubing 1, and an externally threaded sleeve 4 of substantially the same diameter as said tubing, over the end of which it is adapted to be disposed. The shoulder 5, formed by the difference in diameters of the bores of the two different parts of the coupling member, abuts the end of the tube as shown. The free edge of the inner surface of the sleeve 4 is slightly outwardly flared as at 6.

The coupling 2 is secured to the end of the tubing 1, by means of a clamping and retaining ring 7 and a bendable compression band 8. These members are slipped over the end of the tubing before the coupling is disposed thereon, and the normal inner diameter of the band 8 being substantially the same as the outer diameter of said tubing, while the inner diameter of the major portion of the ring 7 is greater than that of said tubing and similar to the outer diameter of the sleeve 4. Thus the band is easily located within the ring 7, it being of considerably less width than the latter.

The outer portion of the ring 7 is internally screw threaded for engagement with the threads of the sleeve 4, and its opposite end is formed with an annular inwardly extending inclined shoulder, the inner diameter of this part of the ring being substantially the same as the external diameter of the tubing. The exterior of the clamping and retaining ring is preferably hexagonal or otherwise polygonal in cross-section, so to permit the effective engagement of a wrench or the like therewith. Similarly the coupling 2 is provided with a knurled ridge 9.

The bendable compression ring 8 has its inner surface provided with a plurality of annular barbs 10, in order that it may more effectively engage the outer surface of the tubing upon which it is compressed. Extended from both ends of the band to a point approximately its center are a plurality of transverse kerfs 11, those at one end being staggered with relation to those of the opposite end, whereby the ends of the band may be readily bent into the exterior surface of the tubing, while the central portion of the band retains its original diameter.

In assemblying the several parts of the invention and the elements with which it is associated, the same are first arranged upon the tubing in the relation shown in Figure 1 of the drawing, it being borne in mind that the band 8 is of the approximate diameter as the tubing before being compressed. The clamping ring 7 is then engaged with the threaded sleeve 4 of the coupling and is gradually threaded on to the sleeve until the band 8 engages the flared shoulder 6. At the same time, the opposite end of the band will be engaged by the annular inclined shoulder of the clamping ring 7, resulting in the bending or compressing of the kerfed ends of the band into the tubing. While the central portion of the band retains its normal diameter and serves as an anchor for the clamping ring 7, which in turn holds the coupling 2 into a fluid-tight connection with the end of the tubing.

It has been found, in attaching couplings to tubing of this character where it is impossible to use a spreader, that the bending of only the rear end of the band will not hold, as the same can be stripped or pulled from the tubing when the clamping ring is threaded upon the coupling. It will therefore be seen that the present invention, which provides for compressing both ends of the band into the tubing forms a rigid and secure means upon which to lock the coupling.

I claim:

The combination of a flexible tubing having a non-elastic inner core, of a coupling comprising a member having a bore for receiving one end of said tubing, a ring surrounding said tubing and having staggered kerfs extending from opposite edges thereof, and a compression sleeve surrounding said tubing and threaded to said member, said member and said sleeve having oppositely extending concave faces and said ring having a convex outer portion adapted to cooperate with said faces, said ring having a plurality of inwardly directed teeth, all of such teeth extending towards the said end of such tubing, whereby when said sleeve is screwed upon said member, the teeth of said ring are caused to bite into said flexible tubing, the nonelastic core of said tubing preventing collapsing thereof.

In testimony that I claim the foregoing I have hereunto set my hand at Manitowoc in the county of Manitowoc and State of Wisconsin.

JOSEPH P. EASTMAN.